Patented July 29, 1930

1,771,823

UNITED STATES PATENT OFFICE

BRUCE A. STEVENS, OF HYDE PARK, MASSACHUSETTS

ADHESIVE AND PROCESS OF MANUFACTURING THE SAME

No Drawing.   Application filed March 28, 1929.  Serial No. 350,814.

The object of the invention is the production of an adhesive which will act effectively upon oily surfaces, thereby making it possible to secure together articles having oily characteristics or articles having surfaces that are impregnated with oil.

My composition consists of a mixture of ground glue, preferably animal glue, acetic acid (preferably pure cider vinegar) and glucose.

In preparing the composition I prefer to use the ingredients in about the following proportions, viz:—1 oz. of ground glue dissolved in 5 ozs. of vinegar, to which is added ½ oz. of glucose. This composition is then heated and allowed to boil for seven minutes.

While it is desirable to employ animal glue, it is evident that other well known forms of glue may be employed successfully.

The addition of the glucose to the mixture increases the stickiness of the composition, and the action of the vinegar in the composition is to cut the oil that is present upon the surface of the articles to which the adhesive is applied, with the result that the adhesive will effectively secure together said articles.

I claim:—

1. An adhesive composition comprising ground glue, acetic acid and glucose.

2. An adhesive composition comprising ground glue, cider vinegar and glucose.

3. An adhesive composition comprising 1 ounce of ground glue, 5 ounces of cider vinegar and one-half ounce of glucose.

4. The process of manufacturing an adhesive composition which consists in dissolving 1 ounce of ground glue in 5 ounces of vinegar, then adding one-half ounce of glucose, and finally heating the composition and allowing the same to boil approximately seven minutes.

In testimony whereof I have hereunto set my hand.

BRUCE A. STEVENS.